(12) United States Patent
Ishikawa et al.

(10) Patent No.: US 9,787,358 B2
(45) Date of Patent: Oct. 10, 2017

(54) DEVICE AND METHOD FOR DECIDING CHARACTERISTICS OF DIFFERENTIAL SIGNAL CABLE

(71) Applicant: Hitachi Metals, Ltd., Tokyo (JP)

(72) Inventors: Hiroshi Ishikawa, Hitachi (JP);
Takahiro Sugiyama, Hitachi (JP);
Izumi Fukasaku, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/994,373

(22) Filed: Jan. 13, 2016

(65) Prior Publication Data

US 2016/0218771 A1 Jul. 28, 2016

(30) Foreign Application Priority Data

Jan. 28, 2015 (JP) .................................. 2015-013969

(51) Int. Cl.
*H04B 3/00* (2006.01)
*H04L 25/00* (2006.01)
*H04B 3/46* (2015.01)
*H04L 12/26* (2006.01)
*H04B 3/50* (2006.01)

(52) U.S. Cl.
CPC ................ *H04B 3/46* (2013.01); *H04B 3/50* (2013.01); *H04L 43/0847* (2013.01)

(58) Field of Classification Search
None
See application file for complete search history.

(56) References Cited

U.S. PATENT DOCUMENTS

| 4,634,964 | A | * | 1/1987 | Chattler | G01R 27/2605 324/628 |
|---|---|---|---|---|---|
| 5,502,391 | A | * | 3/1996 | Sciacero | H04B 3/487 324/628 |
| 2004/0247022 | A1 | * | 12/2004 | Raghavan | H04B 3/32 375/219 |
| 2013/0273776 | A1 | * | 10/2013 | Deng | H01R 13/6485 439/620.01 |

FOREIGN PATENT DOCUMENTS

JP 2013-046283 A 3/2013

* cited by examiner

*Primary Examiner* — Shuwang Liu
*Assistant Examiner* — Gina McKie
(74) *Attorney, Agent, or Firm* — Roberts Mlotkowski Safran Cole & Calderon P.C.

(57) ABSTRACT

A device for deciding characteristics of a differential signal cable at a transmission rate of not less than 10 G baud includes a selector switch that changes a transmission rate or an output power of a test signal to be supplied to the differential signal cable, a signal transmitting circuit that generates a test signal at a different transmission rate or output power as one of the predetermined number of plurality of test signals according to the change of state of the selector switches and sends the generated test signal to the differential signal cable via one connector, and a signal receiving circuit that receives the test signal transmitted through the differential signal cable via the other connector and decides the success or failure of transmission of the test signal through the differential signal cable based on the received test signal and pre-stored data of the plurality of test signals.

7 Claims, 6 Drawing Sheets

16 DISPLAY DEVICE

| TRANSMISSION RATE | DC |
| --- | --- |
| | 10 Gbaud |
| | 25 Gbaud |
| OUTPUT | 1 mW |
| | 3 mW |
| | 10 mW |
| | 30 mW |
| | 100 mW |

FIG.2B

26 DISPLAY DEVICE

| OUTPUT | SIGNAL LINE No. | 1 | 2 | 3 | 4 | 5 | 6 | 7 | 8 |
| --- | --- | --- | --- | --- | --- | --- | --- | --- | --- |
| 1 mW | DC | O | O | O | O | O | O | O | O |
| 3 mW | | × | × | × | × | × | × | × | × |
| 10 mW | 10G baud | O | O | O | O | O | O | O | O |
| | | × | × | × | × | × | × | × | × |
| 30 mW | 25G baud | O | O | O | O | O | O | O | O |
| 100 mW | | × | × | × | × | × | × | × | × |

DEVICE AND METHOD FOR DECIDING CHARACTERISTICS OF DIFFERENTIAL SIGNAL CABLE

The present application is based on Japanese patent application No. 2015-013969 filed on Jan. 28, 2015, the entire contents of which are incorporated herein by reference.

BACKGROUND OF THE INVENTION

1. Field of the Invention

The invention relates to a device and method for deciding characteristics of a differential signal cable and, in particular, to a device and method for deciding characteristics of a differential signal cable which is used for high-speed differential signal transmission at a transmission rate of not less than 10 G baud.

2. Description of the Related Art

High-speed differential signal transmission at not less than 10 G baud is performed for communication between servers and switches in data centers, or for inter-device communication or in-device communication of high-performance computing (HPC) systems. In comparison with conventional differential signal cables used for transmitting differential signals at several G baud, differential signal cables used for transmitting high-speed differential signals at not less than 10 G baud have a trouble to transmit signals even with slight variation in transmission characteristics. The variation in transmission characteristics is caused by e.g., fine dust attached to a connector portion or bending of cable with an extremely small radius of curvature due to mishandling etc.

When transmitting high-speed differential signals at not less than 10 G baud, communication failure may occur due to variation in transmission characteristics of differential signal cable as well as due to, e.g., a malfunction of a transmitting or receiving circuit, inadequate setting of the transmitting or receiving circuit, design and manufacturing conditions (transmission loss, signaling rate, characteristics of via stub, etc.) of a printed circuit board connecting the transmitting and receiving circuits to the cable, or inappropriate insertion/removal of connector, etc. Furthermore, communication failure also may occur due to indirect causes such as the cooling state of the device or unstable power supply.

In the high-speed differential signal transmission at not less than 10 G baud, signals equalization is generally performed by a transmitter-side circuit or a receiver-side circuit to shape the signal waveform and the optimal setting values of equalizer parameters are different depending on frequency characteristics of transmission components. The optimal setting values of equalizer parameters are often determined by auto setting algorithm of the transmitting and receiving circuits. However, the auto setting may fail since optimization of the auto setting algorithm is not necessarily designed for the differential signal cable.

For such reasons, it is difficult to identify the cause of communication failure, particularly difficult to detect a malfunction of a differential signal cable when the differential signal cable is used for high-speed differential signal transmission at not less than 10 G baud. Based on this fact, devices and methods for inspecting differential signal cables have been examined, and one of which is, e.g., a method in which a pseudo random signal is send and received to measure a bit error rate (see JP-A-2013-046283).

SUMMARY OF THE INVENTION

The method disclosed in JP-A-2013-046283 is advantageous in that evaluation can be highly accurate and characteristics of a differential signal cable used for high-speed differential signal transmission can be precisely inspected by a single device. However, a transmitting and receiving device thereof is large in size and the cost of the entire device is high. Therefore, it is physically and financially difficult to install a conventional large and expensive inspection device for a data center having highly densely arranged connection devices or a high-performance computing system.

It is an object of the invention to provide a device for deciding the characteristics of the differential signal cable that allows easy evaluation of transmission characteristics of the differential signal cable used for the high-speed differential signal transmission at not less than 10 G baud in the same environment as the usage situation of the cable, as well as a method for deciding the characteristics of the differential signal cable.

(1) According to an embodiment of the invention, a device for deciding characteristics of a differential signal cable used for high-speed differential signal transmission at a transmission rate of not less than 10 G baud comprises:

a pair of connectors to be connected to both ends of the differential signal cable;

a selector switch that changes a transmission rate or an output power of a test signal to be supplied to the differential signal cable;

a signal transmitting circuit that generates a test signal at a different transmission rate or output power as one of the predetermined number of plurality of test signals according to the change of state of the selector switches and sends the generated test signal to the differential signal cable via one of the pair of connectors;

a signal receiving circuit that receives the test signal transmitted through the differential signal cable via the other of the pair of connectors and decides the success or failure of transmission of the test signal through the differential signal cable based on the received test signal and pre-stored data of the plurality of test signals;

a display device that displays a decision result from the signal receiving circuit; and a power supply that supplies power to the signal transmitting circuit, the signal receiving circuit and the display device.

(2) According to another embodiment of the invention, a method for deciding characteristics of a differential signal cable comprises:

using the device for deciding characteristics of a differential signal cable mentioned above; and deciding the success or failure of transmission of plurality of test signals at different transmission rates or output powers through the differential signal cable.

Effects of the Invention

According to an embodiment of the invention, a device for deciding the characteristics of the differential signal cable can be provided that allows easy evaluation of transmission characteristics of the differential signal cable used for the high-speed differential signal transmission at not less than 10 G baud in the same environment as the usage situation of the cable, as well as a method for deciding the characteristics of the differential signal cable.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

First Embodiment

Figure 1:
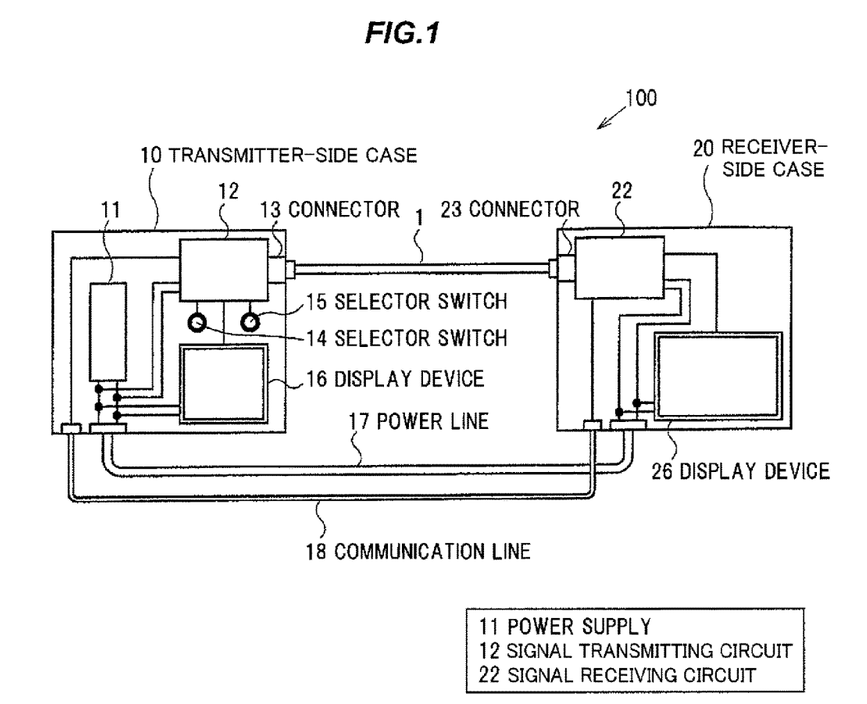
FIG. 1 is an illustration diagram showing a configuration of a characteristic decision device for a differential signal cable in a first embodiment of the present invention.

FIG. 1 is an illustration diagram showing a configuration of a characteristic decision device for a differential signal cable in the first embodiment of the invention. When communication failure occurs in high-speed differential signal transmission at not less than 10 G baud through a differential signal cable, a characteristic decision device of the invention is used to decide whether or not the cause of communication failure is a malfunction of the differential signal cable.

A characteristic decision device 100 in the first embodiment includes a transmitter-side case 10, a receiver-side case 20, and a power line 17 and a communication line 18 which connect the transmitter-side case 10 to the receiver-side case 20. The transmitter-side case 10 houses a power supply 11, a signal transmitting circuit 12, a connector 13, selector switches 14 and 15 and a display device 16. The receiver-side case 20 houses a signal receiving circuit 22, a connector 23 and a display device 26. The signal transmitting circuit 12 and the signal receiving circuit 22 are each formed of IC elements.

When communication failure occurs in high-speed differential signal transmission at not less than 10 G baud through a differential signal cable 1, a user of the characteristic decision device 100 detaches the differential signal cable 1 from connection devices on both sides, and connects one end of the differential signal cable 1 to the connector 13 of the transmitter-side case 10 and another end to the connector 23 of the receiver-side case 20. The connectors 13 and 23 are configured to be removable from the transmitter-side case 10 and the receiver-side case 20 and to be replaceable.

Inside the transmitter-side case 10, power of the power supply 11 is supplied to the signal transmitting circuit 12 and the display device 16. The power of the power supply 11 is also supplied to the receiver-side case 20 from the transmitter-side case 10 through the power line 17 and is then supplied to the signal receiving circuit 22 and the display device 26 inside the receiver-side case 20.

The selector switches 14 and 15 in the transmitter-side case 10 are switches to be manually operated by the user of the characteristic decision device 100, one of which is for changing a transmission rate of a test signal and another is for changing an output power of the test signal.

The signal transmitting circuit 12 generates a test signal at a different transmission rate or output power as one of the predetermined number of plural test signals according to the change of state of the selector switches 14 and 15 and sends the generated test signal to the differential signal cable 1 via the connector 13. The test signal may be a PRBS signal (pseudo random code sequence). Also, a signal indicating a transmission condition parameter (transmission rate, output power, etc.) for a test signal to be sent and a setting parameter for the signal receiving circuit are sent from the signal transmitting circuit 12 to the signal receiving circuit 22 in the receiver-side case 20 through the communication line 18.

The signal receiving circuit 22 in the receiver-side case 20 receives the test signal transmitted through the differential signal cable 1 via the connector 23 and decides the success or failure of transmission of the test signal through the differential signal cable 1 based on the received test signal and pre-stored data of the plural test signals. As an example, the signal receiving circuit 22 performs a decision operation as follows.

Figure 6:
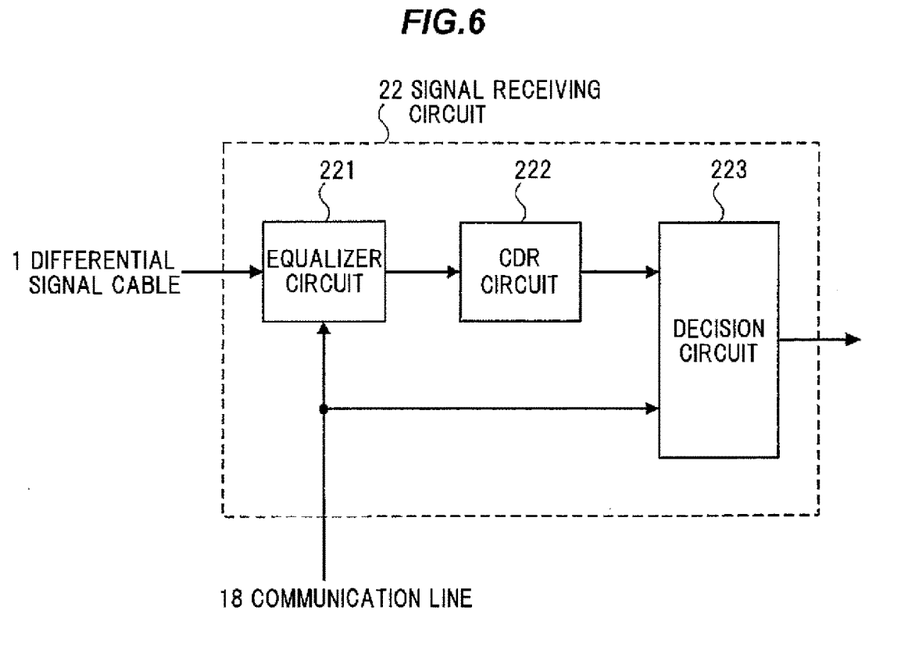
FIG. 6 is an illustration diagram showing a configuration example of a signal receiving circuit.

FIG. 6 is an illustration diagram showing a configuration example of the signal receiving circuit 22. The signal receiving circuit 22 is provided with an equalizer circuit 221 for compensating degradation of an analog waveform occurred in a test path from the signal transmitting circuit 12 to the signal receiving circuit 22, a clock data recovery (CDR) circuit 222 for converting the compensated analog waveform into a digital data stream, and a decision circuit 223 for comparing the received digital data with the transmit digital data and outputting a decision result.

The signal receiving circuit 22 reads the setting parameters from a built-in memory or through the communication line 18 and, in accordance with the setting parameter, compensates an analog waveform in the equalizer circuit 221 and converts the analog waveform into digital data in the CDR circuit 222. The decision circuit 223 compares the received digital data transmitted through the differential signal cable 1 with the sent digital data, and decides the success or failure of transmission of the test signal through the differential signal cable 1 based on a statistical data error rate. Here, since the test signal is decided according to a certain mathematical rule, the signal receiving circuit 22 can precisely restore the sent digital data stream only based on a few setting parameters read out from the built-in memory or through the communication line 18.

By setting the setting parameters of the equalizer circuit 221 at a condition which makes the signal transmission likely to fail, the signal receiving circuit 22 of the invention can easily decide the success or failure of transmission using a test signal at a lower bit rate than a general device. Therefore, the signal receiving circuit 22 of the invention can easily decide whether or not signals can be transmitted through the differential signal cable 1, without performing, e.g., typical bit error rate measurement.

Figure 2A:
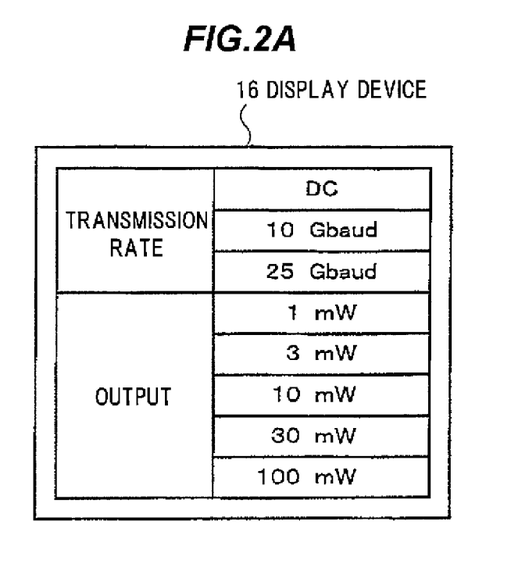
FIG. 2A is an illustration diagram showing an example of a display on a transmitter-side display device.

The display device 16 in the transmitter-side case 10 displays a transmission rate and an output power of the test signal which are changed by the selector switches 14 and 15. FIG. 2A is an illustration diagram showing an example of a display on the display device 16. In this example, the transmission rate of the test signal is changed in three stages, DC (direct current), 10 G baud and 25 G baud, by one of the selector switches 14 and 15. The display device 16 indicates the transmission rate of the test signal by illuminating a corresponding area among the three stages.

Meanwhile, in this example, the output power of the test signal is changed in five stages, 1 mW, 3 mW, 10 mW, 30 mW and 100 mW, by the other of the selector switches 14 and 15. The display device 16 indicates the output power of the test signal by illuminating a corresponding area among the five stages.

Figure 2B:
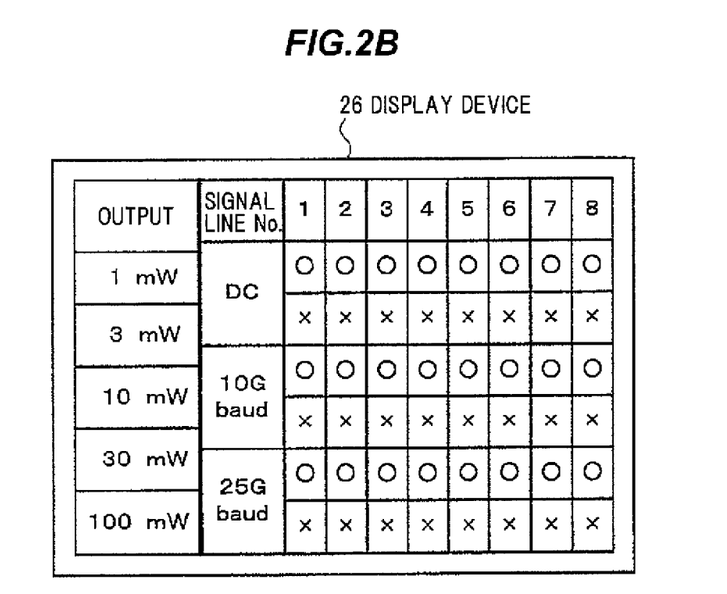
FIG. 2B is an illustration diagram showing an example of a display on a receiver-side display device.

The display device 26 in the receiver-side case 20 displays the decision result from the signal receiving circuit 22. FIG. 2B is an illustration diagram showing an example of a display on the display device 26. The display device 26 firstly indicates the output power of the test signal by illuminating a corresponding area among the five stages, in the same manner as the display device 16. Then, on the display device 26, the success or failure of signal transmission at a transmission rate of DC, 10 G baud or 25 G baud decided by the signal receiving circuit 22 is displayed for each signal line of the differential signal cable 1 by, e.g., a symbol or a letter indicating the success or failure such as ◯ (transmission success) or ×(transmission failed), or by color coding to indicate the success or failure.

Alternatively, the decision result from the signal receiving circuit 22 may be displayed on the display device 16 in the transmitter-side case 10. In such a case, a signal indicating the decision result from the signal receiving circuit 22 is sent from the receiver-side case 20 to the transmitter-side case 10 through the communication line 18.

When using the characteristic decision device 100 in the first embodiment to decide whether or not the cause of communication failure is a malfunction of the differential signal cable 1, the decision only based on the success or failure of transmission of a test signal with a single transmission rate and output power is not sufficiently reliable. Therefore, the success or failure of transmission of a test signal at a different transmission rate or output power is also decided and the result thereof is taken into account, thereby allowing decision reliability to be improved.

For example, when it is decided that transmission of the test signal at a transmission rate of 25 G baud and an output power of 1 mW is successful, there is no problem with the characteristics of the differential signal cable 1. Meanwhile, when it is decided that transmission of the test signal at a transmission rate of 25 G baud and an output power of 1 mW is failed, transmission is possibly successfully performed by changing the setting of the equalizer parameters, etc., as long as the transmission of the test signal at a transmission rate of 25 G baud and an output power of 3 mW is successful, even though there is a little problem with the characteristics of the differential signal cable 1. However, when the transmission of the test signal at a transmission rate of DC is failed, the differential signal cable 1 has a critical problem such as disconnection due to breakage.

Functions and Effects of the First Embodiment

The following functions and effects are obtained in the first embodiment.

(1) It is possible to easily evaluate transmission characteristics of the differential signal cable 1 used for high-speed differential signal transmission at not less than 10 G baud in the same environment as the usage state of the cable by using the low-cost and portable characteristic decision device 100. Therefore, when communication failure occurs in high-speed differential signal transmission at not less than 10 G baud, it is possible to easily decide whether the cause of communication failure is a malfunction of the differential signal cable 1 or something else.

(2) It is applicable to an active copper cable (ACC) having a signal correction circuit formed of IC elements, etc., for correcting amplitude attenuation or timing shift of signals, as well as applicable to a direct attach cable (DAC) not having such a circuit.

(3) The pair of connectors 13 and 23 to be connected to both ends of the differential signal cable 1 are removable and replaceable, and can be replaced when worn out after very frequent use. Therefore, it is possible to perform decision without being affected by wear of the connectors 13 and 23.

(4) The transmitter-side case 10 houses the connector 13, the selector switches 14 and 15 and the signal transmitting circuit 12, the receiver-side case 20 houses the connector 23 and the signal receiving circuit 22, and the communication line 18 is provided to connect the transmitter-side case 10 to the receiver-side case 20 and to transmit a signal indicating a transmission condition parameter for a test signal from the signal transmitting circuit 12 to the signal receiving circuit 22. Therefore, when communication failure occurs in high-speed differential signal transmission at not less than 10 G baud, it is possible to evaluate the differential signal cable 1 in the state as being detached from the devices on the both sides and close to the usage state.

(5) Since the power supply 11 is housed in the transmitter-side case 10 and the power line 17 is provided to supply power of the power supply 11 from the transmitter-side case 10 housing the power supply 11 to the receiver-side case 20, portability of the entire device is improved and only one power supply 11 is required.

(6) The success or failure of transmission through the differential signal cable 1 is decided by using plural test signals at different transmission rates or different output powers. Therefore, it is possible to highly reliably decide whether or not the cause of communication failure is a malfunction of the differential signal cable 1.

Second Embodiment

Figure 3:
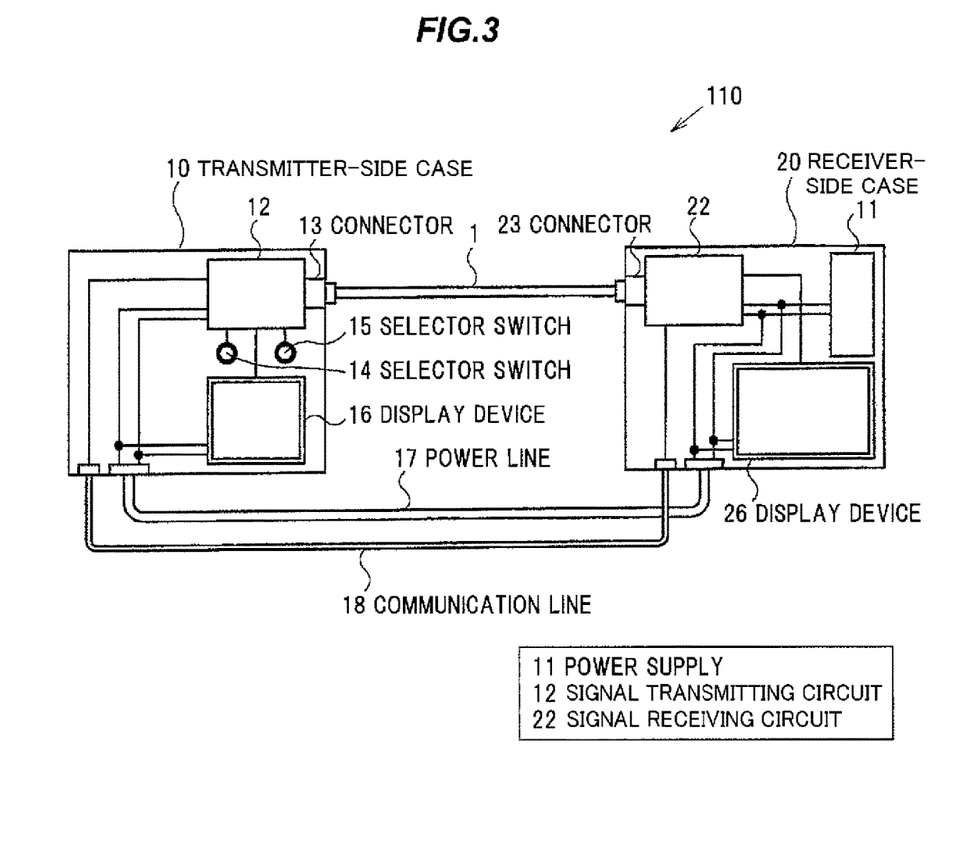
FIG. 3 is an illustration diagram showing a configuration of a characteristic decision device for a differential signal cable in a second embodiment of the invention.

FIG. 3 is an illustration diagram showing a configuration of a characteristic decision device for a differential signal cable in the second embodiment of the invention. A characteristic decision device 110 in the second embodiment is configured that the power supply 11 is housed in the receiver-side case 20. The remaining configuration is the same as the first embodiment shown in FIG. 1.

The power line 17 supplies power of the power supply 11 from the receiver-side case 20 housing the power supply 11 to the transmitter-side case 10.

Functions and Effects of the Second Embodiment

The same functions and effects as (1) to (4) and (6) described in first embodiment are also obtained in the second embodiment.

In addition, since the power supply 11 is housed in the receiver-side case 20 and the power line 17 is provided to supply power of the power supply 11 from the receiver-side case 20 housing the power supply 11 to the transmitter-side case 10, portability of the entire device is improved and only one power supply 11 is required.

Third Embodiment

Figure 4:
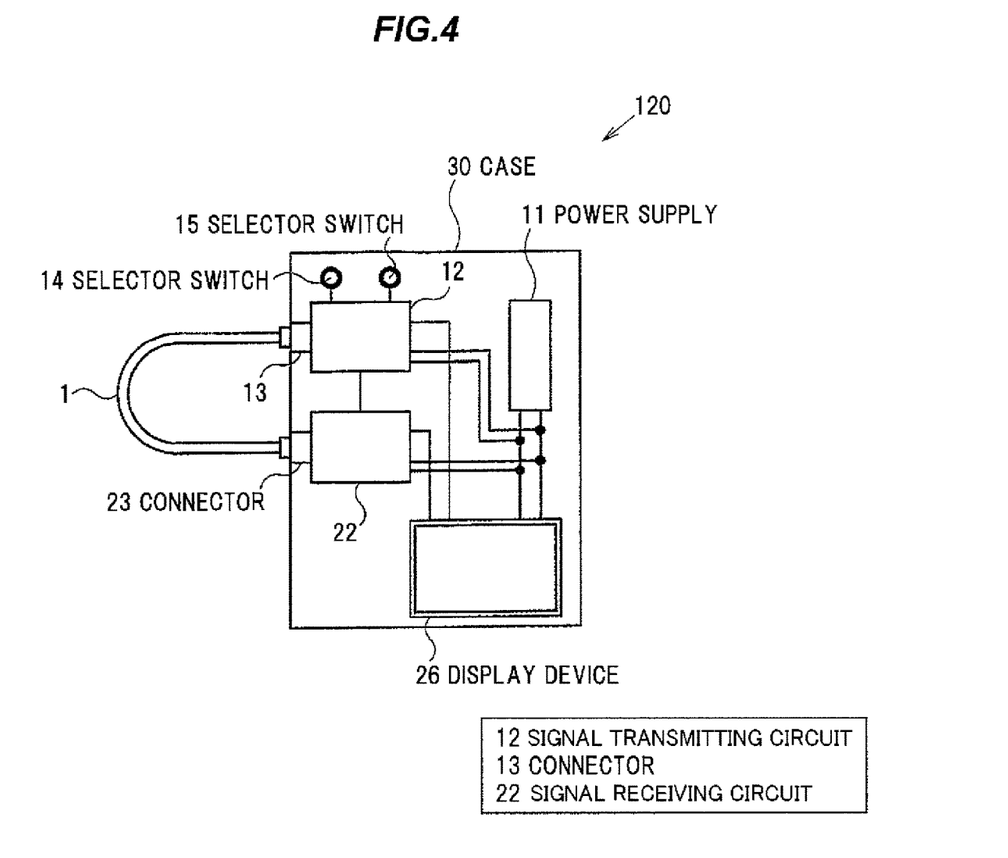
FIG. 4 is an illustration diagram showing a configuration of a characteristic decision device for a differential signal cable in a third embodiment of the invention.

FIG. 4 is an illustration diagram showing a configuration of a characteristic decision device for a differential signal cable in the third embodiment of the invention. A characteristic decision device 120 in the third embodiment is configured that the power supply 11, the signal transmitting circuit 12, the pair of connector 13 and 23, the selector switches 14 and 15, the signal receiving circuit 22 and the display device 26 are housed in a single shared case 30.

When communication failure occurs in high-speed differential signal transmission at not less than 10 G baud through the differential signal cable 1, in order to decide whether or not the cause of communication failure is a malfunction of the differential signal cable 1, a user of the characteristic decision device 120 detaches the differential signal cable 1 from connection devices on both sides, then bends the differential signal cable 1 so that both ends face the characteristic decision device 120, and connects the both ends to the connector 13 and 23.

Inside the case 30, power of the power supply 11 is supplied to the signal transmitting circuit 12, the signal receiving circuit 22 and the display device 26. The signal transmitting circuit 12 generates a test signal at a different transmission rate or output power as one of the predetermined number of plural test signals according to the change of state of the selector switches 14 and 15 and sends the generated test signal to the differential signal cable 1 via the connector 13. The signal receiving circuit 22 receives the test signal transmitted through the differential signal cable 1 via the connector 23 and decides the success or failure of transmission of the test signal through the differential signal cable 1 based on the received test signal and pre-stored data of the plural test signals.

At this time, a signal indicating a transmission condition parameter for a test signal to be sent is directly sent from the signal transmitting circuit 12 to the signal receiving circuit 22 inside the case 30. The signal receiving circuit 22 selects one from the pre-stored data of the plural test signals based on the signal received from the signal transmitting circuit 12 and decides whether or not the received test signal matches the selected data.

Functions and Effects of the Third Embodiment

The same functions and effects as (1) to (3) and (6) described in first embodiment are also obtained in the third embodiment.

Furthermore, since the power line 17 and the communication line 18 used in the first and second embodiments are not required, it is possible to form the device at lower cost.

In addition, since the power supply 11 is housed in the single shared case 30, portability of the entire device is improved and only one power supply 11 is required.

Fourth Embodiment

Figure 5:
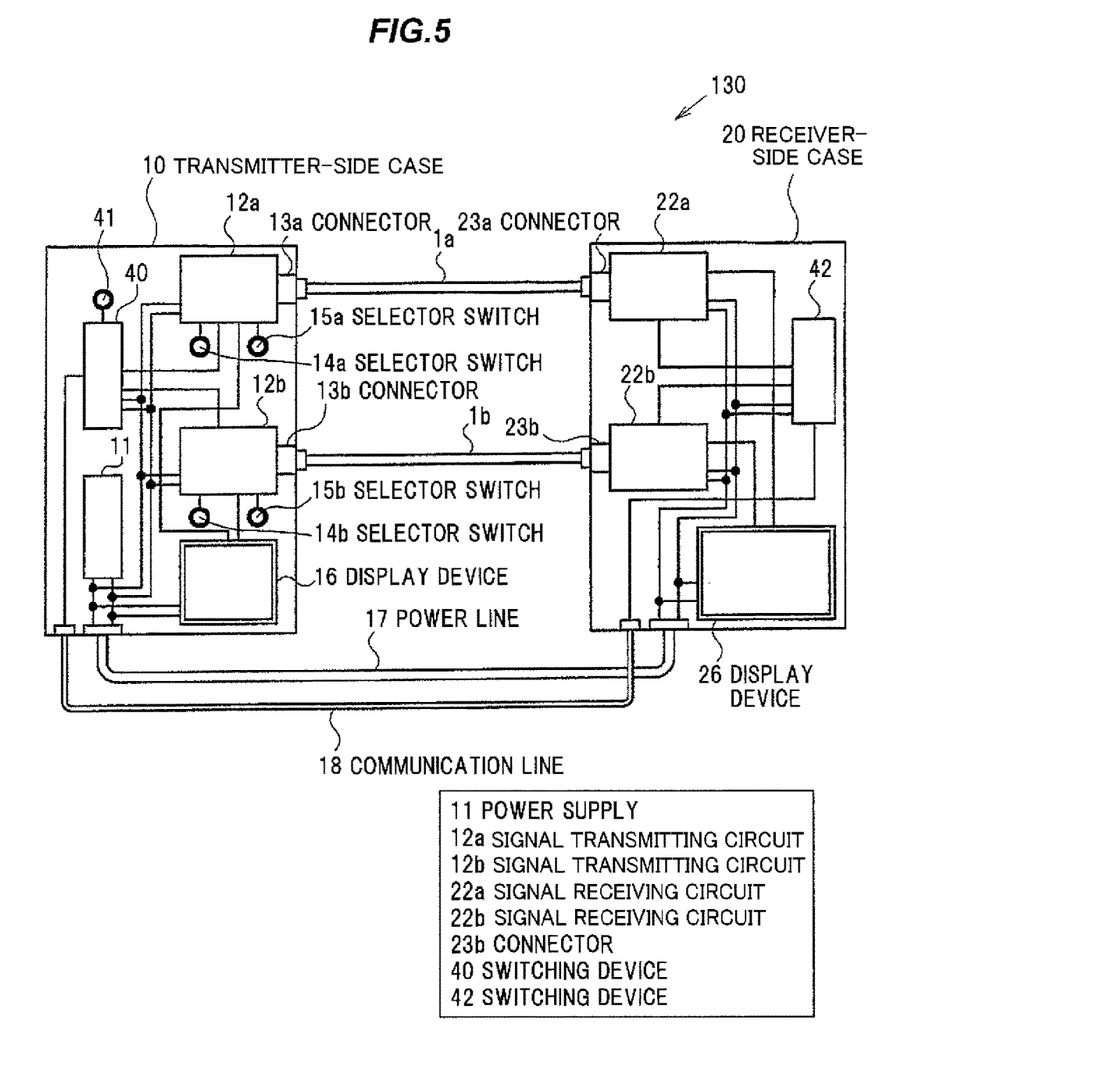
FIG. 5 is an illustration diagram showing a configuration of a characteristic decision device for a differential signal cable in a fourth embodiment of the invention.

FIG. 5 is an illustration diagram showing a configuration of a characteristic decision device for a differential signal cable in the fourth embodiment of the invention. A characteristic decision device 130 in the fourth embodiment is provided with plural pairs of connectors 13a, 23a and 13b, 23b having different shapes, plural signal transmitting circuits 12a and 12b and plural signal receiving circuits 22a and 22b corresponding to the pairs of connectors, and switching devices 40 and 42 for switching between the plural signal transmitting circuits 12a and 12b and between the plural signal receiving circuits 22a and 22b.

The shape of connectors provided at both end is different between a differential signal cable 1a and a differential signal cable 1b. The characteristic decision device 130 is provided with a pair of connectors 13a and 23a having a shape corresponding to the shape of the connectors provided at both end of the differential signal cable 1a, and a pair of connectors 13b and 23b having a shape corresponding to the shape of the connectors provided at both end of the differential signal cable 1b. Although two pairs, the connectors 13a and 23a and the connectors 13b and 23b having a different shape, are provided in the fourth embodiment, a pair of connectors having a still different shape may be further provided.

The signal transmitting circuit 12a corresponding to the connector 13a and the signal transmitting circuit 12b corresponding to the connector 13b are provided inside the transmitter-side case 10. Meanwhile, the signal receiving circuit 22a corresponding to the connector 23a and the signal receiving circuit 22b corresponding to the connector 23b are provided inside the receiver-side case 20.

A selector switch 41 in the transmitter-side case 10 is a switch to be manually operated by a user of the characteristic decision device 130. The switching device 40 switches between the signal transmitting circuit 12a and the signal transmitting circuit 12b according to the change of state of the selector switch 41. The switching device 40 sends a signal indicating information about the result of switching to the receiver-side case 20 through the communication line 18. The switching device 42 in the receiver-side case 20 switches between the signal receiving circuit 22a and the signal receiving circuit 22b according to the received signal.

Functions and Effects of the Fourth Embodiment

The same functions and effects as (1) to (6) described in first embodiment are also obtained in the fourth embodiment.

In addition, since the plural pairs of connectors 13a, 23a and 13b, 23b having different shapes, the plural signal transmitting circuits 12a and 12b and the plural signal receiving circuits 22a and 22b corresponding to the pairs of connectors, and the switching devices 40 and 42 for switching between the plural signal transmitting circuits 12a and 12b and between the plural signal receiving circuits 22a and 22b are provided, it is adaptable to plural differential signal cables la and lb which are provided with connectors having different shapes.

Summary of the Embodiments

Technical ideas understood from the embodiments will be described below citing the reference numerals, etc., used for the embodiments. However, each reference numeral described below is not intended to limit the constituent elements in the claims to the members, etc., specifically described in the embodiments.

A device for deciding characteristics of a differential signal cable (1) used for high-speed differential signal transmission at a transmission rate of not less than 10 G baud, the device comprising: a pair of connectors (13, 23) to be connected to both ends of the differential signal cable (1); selector switches (14, 15) that each change a transmission rate or an output power of a test signal to be supplied to the differential signal cable (1); a signal transmitting circuit (12) that generates a test signal at a different transmission rate or output power as one of the predetermined number of plurality of test signals according to the change of state of the selector switches (14, 15) and sends the generated test signal to the differential signal cable (1) via one of the pair of connectors (13, 23); a signal receiving circuit (22) that receives the test signal transmitted through the differential signal cable (1) via the other of the pair of connectors (13, 23) and decides the success or failure of transmission of the test signal through the differential signal cable (1) based on the received test signal and pre-stored data of the plurality of test signals; a display device (26) that displays a decision result from the signal receiving circuit (22); and a power supply (11) that supplies power to the signal transmitting circuit (12), the signal receiving circuit (22) and the display device (26).

The device for deciding characteristics of a differential signal cable, wherein the pair of connectors (13, 23) are removable and replaceable.

The device for deciding characteristics of a differential signal cable, further comprising: a transmitter-side case (10) that houses one of the pair of connectors (13, 23), the selector switches (14, 15) and the signal transmitting circuit (12); a receiver-side case (20) that houses the other of the pair of connectors (13, 23) and the signal receiving circuit (22); and a communication line (18) that connects the transmitter-side case (10) to the receiver-side case (20), wherein the signal transmitting circuit (12) sends, through the communication line (18) to the signal receiving circuit (22), a signal indicating a transmission condition parameter for a test signal to be sent, and the signal receiving circuit (22) selects one from the pre-stored data of the plurality of test signals based on the signal received through the communication line (18) and decides whether or not the received test signal matches the selected data.

The device for deciding characteristics of a differential signal cable, wherein the power supply (11) is housed in either the transmitter-side case (10) or the receiver-side case (20), and a power line (17) is provided to supply power of the power supply (11) from the transmitter-side case (10) housing the power supply (11) to the receiver-side case (20), or from the receiver-side case (20) housing the power supply (11) to the transmitter-side case (10).

The device for deciding characteristics of a differential signal cable, further comprising a single shared case (30) that houses the pair of connectors (13, 23), the selector switches (14, 15), the signal transmitting circuit (12), the signal receiving circuit (22), the display device (26) and the power supply (11), wherein the signal transmitting circuit (12) sends, directly to the signal receiving circuit (22) inside the case (30), a signal indicating a transmission condition parameter for a test signal to be sent, and the signal receiving circuit (22) selects one from the pre-stored data of the plurality of test signals based on the signal received from the signal transmitting circuit (12) and decides whether or not the received test signal matches the selected data.

The device for deciding characteristics of a differential signal cable, further comprising: plurality of pairs of connectors (13a, 23a) and (13b, 23b) having different shapes; a plurality of signal transmitting circuits (12a, 12b) and a plurality of signal receiving circuits (22a, 22b) corresponding to the pairs of connectors; and switching devices (40, 42) that each switch the plurality of signal transmitting circuits (12a, 12b) and the plurality of signal receiving circuits (22a, 22b).

A method for deciding characteristics of a differential signal cable, comprising: using the device (100/110/120/130) for deciding characteristics of a differential signal cable; and deciding the success or failure of transmission of plurality of test signals at different transmission rates or output powers through the differential signal cable (1).

Although the embodiments of the invention have been described, the invention according to claims is not to be limited to the embodiments. Further, please note that all combinations of the features described in the embodiments are not necessary to solve the problem of the invention.

The invention can be appropriately modified and implemented without departing from the gist thereof. For example, the displays on the display devices 16 and 26 are not limited to those described in the embodiments and may be indicated by, e.g., on/off of plural lamps, or may be letters or symbols on a liquid crystal display.

What is claimed is:

1. A device for deciding characteristics of a differential signal cable used for high-speed differential signal transmission at a transmission rate of not less than 10 G baud, the device comprising:
    a pair of connectors to be connected to both ends of the differential signal cable;
    a selector switch that changes a transmission rate or an output power of a test signal to be supplied to the differential signal cable;
    a signal transmitting circuit that generates a test signal at a different transmission rate or output power as one of the predetermined number of plurality of test signals according to the change of state of the selector switches and sends the generated test signal to the differential signal cable via one of the pair of connectors;
    a signal receiving circuit that receives the test signal transmitted through the differential signal cable via the other of the pair of connectors and decides the success or failure of transmission of the test signal through the differential signal cable based on the received test signal and pre-stored data of the plurality of test signals;
    a display device that displays a decision result from the signal receiving circuit; and
    a power supply that supplies power to the signal transmitting circuit, the signal receiving circuit and the display device.

2. The device according to claim 1, wherein the pair of connectors are removable and replaceable.

3. The device according to claim 1, further comprising:
    a transmitter-side case that houses one of the pair of connectors, the selector switches and the signal transmitting circuit;
    a receiver-side case that houses the other of the pair of connectors and the signal receiving circuit; and
    a communication line that connects the transmitter-side case to the receiver-side case,
    wherein the signal transmitting circuit sends, through the communication line to the signal receiving circuit, a signal indicating a transmission condition parameter for a test signal to be sent, and the signal receiving circuit selects one from the pre-stored data of the plurality of test signals based on the signal received through the communication line and decides whether or not the received test signal matches the selected data.

4. The device according to claim 3,
    wherein the power supply is housed in either the transmitter-side case or the receiver-side case, and
    a power line is provided to supply power of the power supply from the transmitter-side case housing the power supply to the receiver-side case, or from the receiver-side case housing the power supply to the transmitter-side case.

5. The device according to claim 1, further comprising
    a single shared case that houses the pair of connectors, the selector switches, the signal transmitting circuit, the signal receiving circuit, the display device and the power supply,
    wherein the signal transmitting circuit sends, directly to the signal receiving circuit inside the case, a signal indicating a transmission condition parameter for a test signal to be sent, and the signal receiving circuit selects one from the pre-stored data of the plurality of test signals based on the signal received from the signal transmitting circuit and decides whether or not the received test signal matches the selected data.

6. The device according to claim 1, further comprising:
    a plurality of pairs of connectors having different shapes;
    a plurality of signal transmitting circuits and
    a plurality of signal receiving circuits corresponding to the pairs of connectors; and a switching device that switches the plurality of signal transmitting circuits and the plurality of signal receiving circuits.

7. A method for deciding characteristics of a differential signal cable used for high-speed differential signal transmission at a transmission rate of not less than 10 G baud, comprising:

connecting a pair of connectors to both ends of the differential signal cable;

changing a transmission rate or an output power of a test signal to be supplied to the differential signal cable by a selector switch;

generating a test signal at a different transmission rate or output power as one of the predetermined number of plurality of test signals in a signal transmission circuit according to the state of the selector switch;

sending the generated test signal from the signal transmission circuit to the differential signal cable via one of the pair of connectors;

receiving the test signal transmitted through the differential signal cable via the other of the pair of connectors at a signal receiving circuit, thereby deciding the success or failure of transmission of plurality of test signals at different transmission rates or output powers through the differential signal cable; and displaying a decision result from the signal receiving circuit.

* * * * *